(12) United States Patent
Ren et al.

(10) Patent No.: US 7,538,181 B2
(45) Date of Patent: May 26, 2009

(54) METHOD FOR PREPARING POLY (LACTIC ACID)-BASED RESIN AND ITS CO-POLYMERS

(75) Inventors: Jie Ren, Shanghai (CN); Qinfeng Wang, Shanghai (CN); Naiwen Zhang, Shanghai (CN)

(73) Assignee: Shanghai Tong-Jie-Liang Biomaterials Co., Ltd., Shanghai (CN)

( * ) Notice: Subject to any disclaimer, the term of this patent is extended or adjusted under 35 U.S.C. 154(b) by 721 days.

(21) Appl. No.: 11/335,575

(22) Filed: Jan. 20, 2006

(65) Prior Publication Data
US 2007/0027296 A1    Feb. 1, 2007

(30) Foreign Application Priority Data
Jul. 29, 2005    (CN) ................ 2005 1 0028305

(51) Int. Cl.
*C08G 63/08* (2006.01)
*C08G 63/06* (2006.01)

(52) U.S. Cl. ............ 528/354; 525/418; 525/419
(58) Field of Classification Search .......... 528/354; 525/418, 419
See application file for complete search history.

(56) References Cited

FOREIGN PATENT DOCUMENTS

JP    2004-003763    7/2005

OTHER PUBLICATIONS

Xu et al; Preparation of thiazoles as cationic polypeptide condensing agents in preparation of peptides; Shanghai Inst. of organic chemistry, Chinese academy of Sciences, Peop. Rep. China; Feb. 2000; Chem Abstract 133: 282083.*

* cited by examiner

*Primary Examiner*—Duc Truong
(74) *Attorney, Agent, or Firm*—Crowell & Moring LLP

(57) ABSTRACT

A method for preparing poly (lactic acid)-based resin or its co-polymers with high molecular weight, the method comprising a condensation process using a thiaole cation condensing agent, as well as the polymers obtained therefrom.

6 Claims, No Drawings

METHOD FOR PREPARING POLY (LACTIC ACID)-BASED RESIN AND ITS CO-POLYMERS

FIELD OF INVENTION

The present invention relates to a new method for preparing poly (lactic acid)-based resin (PLA resins) and its co-polymers, which is characterized by the use of condensing agents in the process of polycondensation in order to promote the chain-extending reaction.

TECHNICAL BACKGROUND

The biodegradable PLA resins have good mechanical properties physical properties mechanical properties as well as biodegradable property and can be degraded in natural environment and be transformed into water and carbon dioxide without harming other organisms. Therefore, PLA resins have attracted a lot of attention in many fields such as medical materials and the substitution of conventional resins.

Polyesters of PLA and their copolymers of the present invention include PLA, PGA, PLA/PGA, PLA/PEG, poly (lactic acid-co-amino acid), PLA/CL, poly (lactic acid-co-Chitosan) or poly (lactic acid-co-ethyl propyl acrylamide), all of which have carboxyl groups and active hydrogen groups in the same molecular. Since these compounds are prepared by deglycolation of the ending hydroxide groups of polyester with low molecular weight, the concentration of the ending groups decrease significantly with the increase of molecular weight, and the increase of molecular weight is limited by the decomposition reaction. Therefore, it is difficult to synthesize a polymer with high enough molecular weight to form a tough film by common deglycolation reaction. In other words, the molecular weight of poly (lactic acid)-based resin prepared by current methods is too low to form practical films. Additionally, the production equipment and production cost are also a problem because of the rigorous reaction condition of high temperature and high vacuum.

Japanese patent 7-228675 discloses a method of producing a polyester with high molecular weight. This method includes a series of processes: first, polyol and polyacid are heated in an organic solvent; second, the generated water is distilled from the organic solvent; third, the organic solvent is dehydrated by a desiccant and then circulated into the reaction system. Through the above processes, the dehydration condensation polymerization takes place. However, this reaction requires high temperature and high vacuum which result in high cost of producing equipment.

JP59-96123 discloses a PLA preparation method by direct condensation polymerization during decompression at high temperature in the presence of catalyst. However, the molecular weight of the PLA is very low and the PLA can not be used widely. U.S. Pat. No. 4,273,920 indicates that the molecular weight of PLA can be up to 30,000 through direct condensation polymerization with high acid ion exchange resin. Although the cost of direct condensation polymerization is low, the molecular weight of the obtained PLA is still too low to meet the demand of industrial application.

A currently known preparation method is a polymerization of dicarboxylic acyl chloride and diol, or a dehydrochlorination reaction of hydroxyl acyl chloride. The high selectivity in the chlorination process of carboxyl has been reported and when thionyl chloride is used as a chlorinating agent, the needed hydroxylic amic acyl chloride can be obtained by esterification between dicarboxylic acid and diatomic alcohol or esterification of hydroxamic acid containing phenyl.

It is also known that hydroxylic amino acyl chloride, and the acyl chloride of lactic acid or its oligomers are unstable, indicating that the existence of such chloride are not completely known. JP4-3763 describes a method of synthesis of PLA, PGA and their copolymers with high molecular weight, wherein the oligomer of PLA or PGA was first reacted with thionyl chloride, oxalyl chloride, succinyl chloride or paraphthaloyl chloride followed by polycondensation. CN 1071340C describes a method of synthesis of PLA utilizing halogenating imidazole onium salt. Lactic acid or its oligomer was first reacted with halogenating imidazole onium salt to obtain acyl chloride and the PLA was synthesized through a dehydrochlorination reaction.

The synthesis of acyl chloride of PLA or its low polymer, however, has not been confirmed, and the obtained polymer has low degree of polymerization. Thus there may be little chance in transforming the carboxyl into acyl chloride by these chlorinating agents.

CN1102583C provides a method of synthesizing a thiaole cation condensing agent which has many virtues such as easy preparation, ready availability of raw material, good stability at room temperature, high re-activity and desirable-optical purity.

DESCRIPTION OF THE INVENTION

The present invention provides a method for preparing poly (lactic acid)-based resin and its co-polymers with high molecular weight by directly using thiaole cation condensing agent in the process.

The condensing agent used in the invention is a thiaole cation condensing agent.

The structural formula of the thiaole Cation condensing agents is as follows:

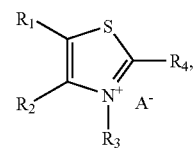

wherein $R^1$, $R^2$, R3=H, $C_nH_{2n+1}$(n=1-5), phenyl or a substituted phenyl;

$R^3$=F; Cl; Br;

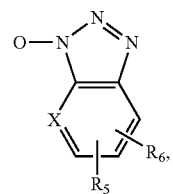

wherein $R^5$, $R^6$=$CF_3$, $NO_2$, X=CH, N;

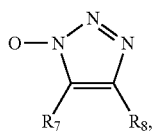

wherein $R^7$, $R^8$=H, $C_nH_{2n+1}$ (n=1-5), COOEt, COOCH$_3$, CF$_3$, NO$_2$;

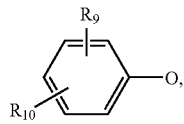

wherein $R^9$, $R^{10}$=NO$_2$, CF$_3$;

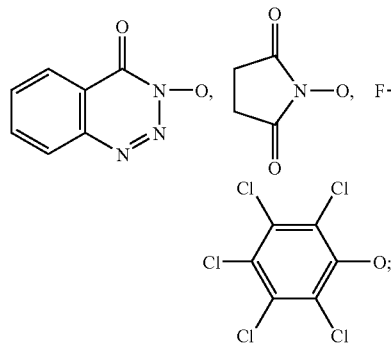

A=SbCl$_6$, SbF$_6$, CF$_3$SO$_3$, PF$_6$, BPh$_4$ or BF$_4$.

EXAMPLES

The present invention will be further understood by referring to the following nonrestrictive examples.

Example 1

100 milliliter of lactic acid containing catalyst and 0.5 gram of

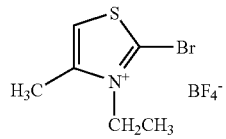

were added to a four-neck flask equipped with thermometer, blender and gas pipe, and with a rotation rate at 50 rounds per minute, the reaction proceeded at 140° C. under durative vacuum (below 40 mmHg) for 10 hours. Poly (lactic acid) product with an average molecular weight of 280,162 was obtained.

Example 2

The same procedure as in Example 1 was used except that 100 gram PLA pre-polymer with a weight average molecular weight of 10,348 was used in the reaction and a final product with a weight average molecular weight of 254,331 was obtained.

Example 3~10

The same procedure as in Example 1 was used except that the condensing agent was one of the following agent:

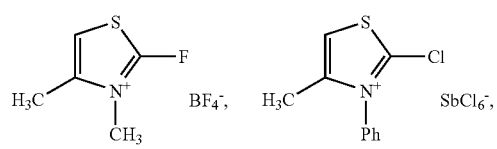

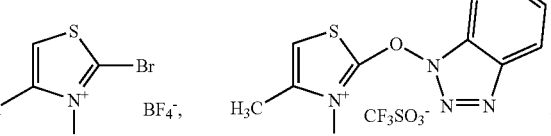

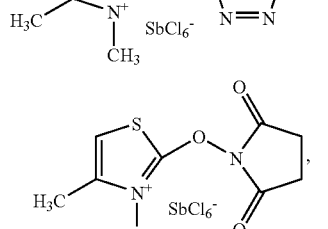

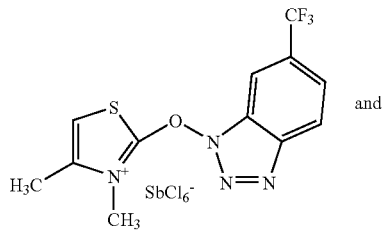

respectively. As a result, the weight average molecular weight of the obtained product was respectively 182,861, 198,089, 188,990, 153,782, 160,319, 169,105, 156,262 and 174,951.

Example 11~18

The same procedure as in Example 2 was used except that the condensing agent is one of the following agent:

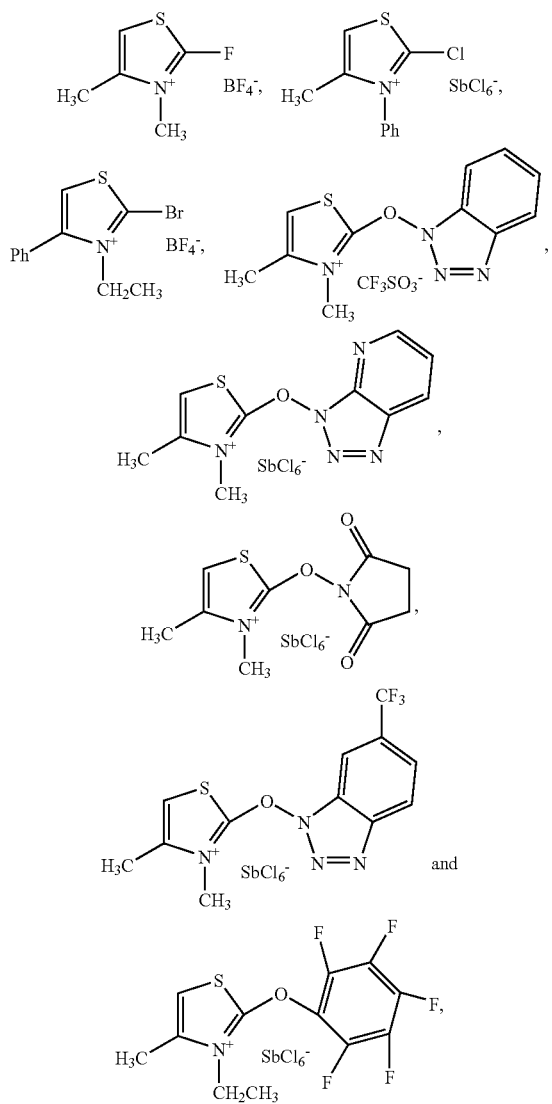

respectively. As a result, the weight average molecular weight of the obtained product was respectively 247,194, 258,8561, 255,294, 221,294, 230,797, 231,126, 209,988 and 240,022.

Example 19

100 milliliter of glycolic acid containing catalyst and 0.5 gram of

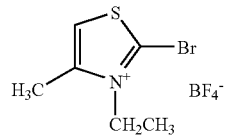

were added to a four-neck flask equipped with thermometer, blender and gas pipe, and with a rotation rate at 200 rounds per minute, the reaction proceeded at 155° C. under vacuum (below 40 mmHg) for 10 hours. Poly (glycolic acid) product with a weight average molecular weight of 214,910 was obtained.

Example 20

100 milliliter of lactic acid mixed with 100 milliliter of glycolic acid containing catalyst and 0.5 gram of

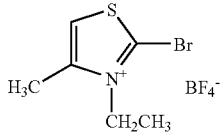

were added to a four-neck flask equipped with thermometer, blender and gas pipe, and with a rotation rate at 180 rounds per minute, the reaction proceeded at 165° C. under vacuum (below 40 mmHg) for 9 hours. Poly (lactic acid-co-glycolic acid) product with a weight average molecular weight of 216,899 was obtained.

Example 21

100 gram of PLA pre-polymer with a weight average molecular weight of 10348 and 100 gram of PEG 10000 were mixed with catalyst and 0.5 gram of

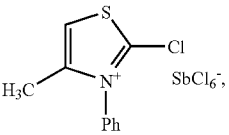

and then added to a four-neck flask equipped with thermometer, blender and gas pipe. With a rotation rate at 210 rounds per minute, the reaction proceeded at 160° C. under vacuum (below 40 mmHg) for 12 hours. the Poly (lactic acid-co-ethylene glycol) product with a weight average molecular weight of 171,285 was obtained.

Example 22~25

The same procedure as in Example 19 was used except that the condensing agent was of one of the following:

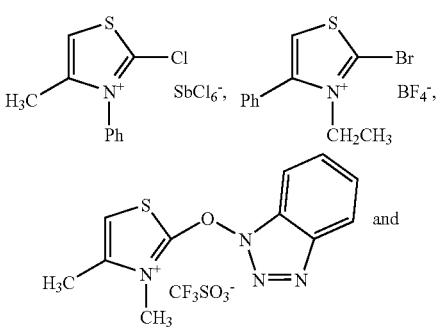

-continued

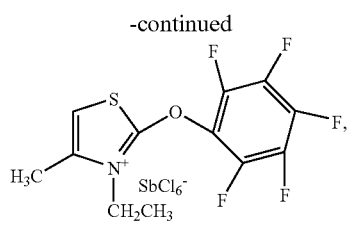

respectively. As a result, the weight average molecular weight of the obtained product was respectively 212,547, 222,758, 189,071 and 191,002.

Example 26~29

The same procedure as in Example 20 was used proceeded except that the condensing agent was substituted by following:

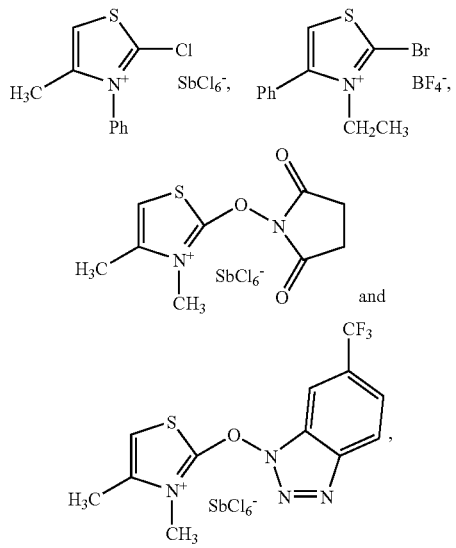

respectively. As a result, the weight average molecular weight of the obtained product was respectively 230,051, 219,988, 179,240 and 184,177.

Comparative Example 1

100 ml L-lactic acid and catalyst were added to a four-neck flask equipped with thermometer, blender and gas pipe, and then heated to 140□ for 20 hours under a vacuum of less than 40 mmHg. Poly (lactic acid) with a weight average molecular weight of 30,439 was obtained.

Comparative Example 2

100 ml L-lactic acid and catalyst were added to a four-neck flask equipped with thermometer, blender and gas pipe, and then heated to 150□ for 22 hours under a vacuum of less than 40 mmHg. Poly(lactic acid) with a weight average molecular weight of 54,712 was obtained.

Comparative Example 3

100 ml glycolic acid and catalyst were added to a four-neck flask equipped with thermometer, blender and gas pipe, and then heated to 155□ for 15 hours under a vacuum of less than 40 mmHg. Then the poly (glycolic acid) with a weight average molecular weight of 67,022 was obtained.

What is claim:

1. A method for preparing poly (lactic acid)-based resin or its co-polymers, comprising a condensation process wherein a thiaole cation condensing agent is used.

2. The method according to claim 1, wherein the thiaole cation condensing agent is a compound of formula I,

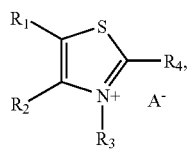

Wherein
R$^1$, R$^2$ and R$^3$ each is independently selected from the group consisting of H, $C_nH_{2n+1}$ where n is an integer from 1 to 5, phenyl and substituted phenyl;
R$^4$ is one selected from F; Cl; Br;

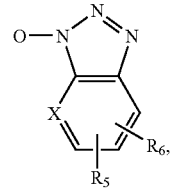

wherein R$^5$ and R$^6$ each is independently CF$_3$ or NO$_2$ and X is independently CH or N;

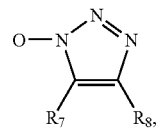

wherein R$^7$ and R$^8$ each is independently H, $C_nH_{2+1}$ where n is an integer from 1 to 5, COOEt, COOCH$_3$, CF$_3$, NO$_2$;

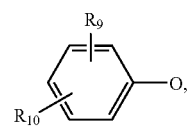

wherein R$^9$ and R$^{10}$ each is independently NO$_2$ or CF$_3$;

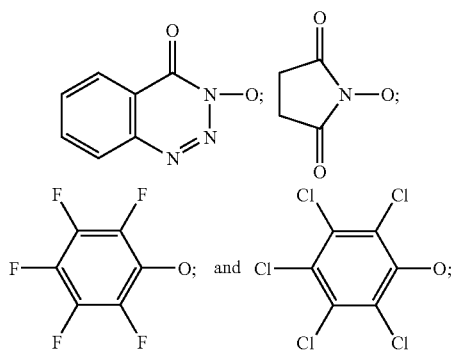

and

A is selected from $SbCl_6$, $SbF_6$, $CF_3SO_3$, $PF_6$, $BPh_4$ or $BF_4$.

3. The method according to claim 2, wherein $R^4$ is F, Cl or Br.

4. The method according to claim 1, wherein the poly (lactic acid)-based resin or its co-polymer is a polyester compound having a carboxyl group and an active hydrogen group in the same molecule.

5. The method according to claim 4, wherein the poly (lactic acid)-based resin is poly (lactic acid) (PLA) or poly (glycolic acid) (PGA).

6. The method according to claim 4, wherein the co-polymer is poly (lactic acid-co-glycolic acid) (PLA/PGA), poly (lactic acid-co-ethylene glycol) (PLA/PEG), poly (lactic acid-co-amino acid), poly (lactic acid-co-caprolactone) (PLA/CL), poly (lactic acid-co-Chitosan) or poly (lactic acid-co-ethyl propyl acrylamide).

* * * * *